United States Patent
Que

(10) Patent No.: US 8,775,795 B2
(45) Date of Patent: Jul. 8, 2014

(54) AUTHENTICATING METHOD AND MOBILE TERMINAL FOR CODE DIVISION MULTIPLE ACCESS (CDMA) EVOLUTION TO PACKET DATA OPTIMIZED (EVDO) NETWORK

(75) Inventor: Yuan Que, Qingdao (CN)

(73) Assignee: Hisense Mobile Communications Technology Co., Ltd. (CN)

( * ) Notice: Subject to any disclaimer, the term of this patent is extended or adjusted under 35 U.S.C. 154(b) by 163 days.

(21) Appl. No.: 13/392,957

(22) PCT Filed: Apr. 29, 2010

(86) PCT No.: PCT/CN2010/072339
§ 371 (c)(1),
(2), (4) Date: Feb. 28, 2012

(87) PCT Pub. No.: WO2011/035580
PCT Pub. Date: Mar. 31, 2011

(65) Prior Publication Data
US 2012/0159154 A1 Jun. 21, 2012

(30) Foreign Application Priority Data
Sep. 25, 2009 (CN) .......................... 2009 1 0176059

(51) Int. Cl.
*H04L 29/00* (2006.01)
(52) U.S. Cl.
USPC .......... 713/155; 713/156; 713/157; 713/158; 380/247; 380/248; 380/249; 380/250
(58) Field of Classification Search
USPC ................................. 713/155–158
See application file for complete search history.

(56) References Cited

U.S. PATENT DOCUMENTS

| 2004/0029580 | A1 | 2/2004 | Haverinen et al. | |
|---|---|---|---|---|
| 2005/0228992 | A1* | 10/2005 | Mizikovsky | 713/168 |
| 2007/0060106 | A1* | 3/2007 | Haverinen et al. | 455/410 |

FOREIGN PATENT DOCUMENTS

| CN | 1602111 | 3/2005 |
|---|---|---|
| CN | 101094067 | 12/2007 |
| CN | 101651945 | 2/2010 |
| CN | 101651946 | 2/2010 |

\* cited by examiner

*Primary Examiner* — Ghazal Shehni
(74) *Attorney, Agent, or Firm* — DLA Piper LLP (US)

(57) ABSTRACT

The successful authenticating of a Network Access Identifier (NAI) process is enabled by an authenticating method and a mobile terminal for a Code Division Multiple Access (CDMA) EVolution to packet Data Optimized (EVDO) network. The authenticating method for the EVDO network includes an NAI authenticating and a Challenge Handshake Authentication Protocol (CHAP) authenticating, in which the NAI authenticating method includes: when it is determined that the identifier supporting a Message-Digest 5 (MD5) authenticating method is stored in a User Identity Model (UIM) (S101), the NAI of a user is read from the UIM (S102); a judgment is made whether the NAI is correct when the NAI of the user is read from the UIM (S103); if the result of the judgment is yes, the read NAI is transmitted to an authentication server to perform an authentication (S104); if the result of the judgment is no, the International Mobile Subscriber Identity (IMSI) of the user is read from the UIM; and the NAI of the user is obtained according to the IMSI and the obtained NAI is transmitted to the authentication server to perform the authentication (S105).

20 Claims, 2 Drawing Sheets

AUTHENTICATING METHOD AND MOBILE TERMINAL FOR CODE DIVISION MULTIPLE ACCESS (CDMA) EVOLUTION TO PACKET DATA OPTIMIZED (EVDO) NETWORK

This application is a US National Stage of International Application No. PCT/CN2010/072339, filed Apr. 29, 2010, designating the United States, and claiming priority to Chinese Patent Application No. 200910176059.5, filed with the Chinese Patent Office on Sep. 25, 2009 and entitled "AUTHENTICATION METHOD AND MOBILE TERMINAL FOR CODE DIVISION MULTIPLE ACCESS EVOLUTION TO PACKET DATA OPTIMIZED EVDO NETWORK", both of which are hereby incorporated by reference in their entirety.

FIELD

The present invention relates to the field of wireless communications and particularly to an authentication method and mobile terminal for CDMA Evolution to packet Data Optimized (EVDO) network.

BACKGROUND a Code Division Multiple Access single-carrier system (CDMA 1X) network and an EVDO network have coexisted for a long period of time during evolution of a Code Division Multiple Access (CDMA) carrier system network toward the $3^{rd}$ Generation (3G) wireless communication network. An authentication method for the EVDO network and that for the CDMA 1X network differ in that a Message Digest 5 (MD5) authentication method is adopted for the EVDO network and a Cellular Authentication and Voice Encryption (CAVE) authentication method is adopted for the CDMA 1X network and hardened in a User Identity Model (UIM) card. In order to be able to support the use of the UIM card for the CDMA 1X network in the EVDO network, it is necessary for the existing authentication method for the EVDO network to support both the MD5 authentication method and the CAVE authentication method concurrently.

The authentication method for the EVDO network is performed generally in two processes: firstly a mobile terminal initiates Network Access Identifier (NAI) authentication, and then an authentication server initiates Challenge Handshake Authentication Protocol (CHAP) authentication. Processing flows of the two processes in a current general platform are as follows:

In the NAI authentication process, the mobile terminal firstly performs an operation of reading the UMI card, and if an identifier supporting the MD5 authentication method stored in the UIM card is read out, that is, if the value at the N5 position is 11, then the mobile terminal retrieves an NAI from the UMI card and transmits the retrieved NAI to the authentication server for authentication; otherwise, it is determined that an authentication method supported by the UIM card is the CAVE authentication method, and the mobile terminal retrieves an International Mobile Subscriber Identity (IMSI) from the UIM card and adds @mycdma.cn resulting in the NAI in the format of IMSI@mycdma.cn, and the mobile terminal transmits the resulting NAI to the authentication server for authentication.

In the CHAP authentication process, the authentication server transmits to the mobile terminal a CHAP authentication request including a name of the CHAP authentication request, a description of the CHAP authentication request and a key value for authentication with a length of, e.g., 16 bytes. Upon reception of the CHAP authentication request, the mobile terminal retrieves the key value and then invokes the MD5 authentication method for calculation if an identifier supporting the MD5 authentication method is stored in the UIM card as determined in the NAI authentication process; otherwise, the mobile terminal invokes the CAVE authentication method for calculation if the UIM card supports the CAVE authentication method. A calculated authentication key value with the same length as that of the key value is transmitted to the authentication server and passes CHAP authentication after being verified by the authentication server without any error.

Next the authentication server transmits to the mobile terminal a username and a password for the mobile terminal to log on the EVDO network, and the mobile terminal logs on the EVDO network, so that the entire authentication process ends.

Since some inevitable human mistakes may occur in the existing hybrid network, the foregoing authentication process suffers from some obvious drawbacks, thus failing to pass authentication in the EVDO network.

Firstly in the NAI authentication process, there are a large number of UIM cards on the current market in which an identifier supporting the MD5 authentication method is stored incorrectly because No NAI is written or an NAI is incorrectly written into the cards due to a mistake occurring in a production process, so that NAI authentication will fail.

Secondly in the CHAP authentication process, the authentication server of the EVDO network may have a drawback because the authentication server may support only the CAVE authentication method but not the MD5 authentication method, so that in the CHAP authentication process, when the MD5 authentication method is invoked to calculate and transmit a set of authentication key values to the authentication server for authentication if an identifier supporting the MD5 authentication method is stored in the UIM card, CHAP authentication may fail because the authentication server does not support the MD5 authentication method. Furthermore there are some UIM cards on the market in which an identifier supporting the MD5 authentication method is stored incorrectly because such a mistake occurs in a production process that the MD5 authentication method is not written into the UIM cards although an identifier supporting the MD5 authentication method is stored therein, that is, the value at the N5 position is 11, so that the MD authentication method may fail to be invoked in the CHAP authentication process and thus CHAP authentication will fail.

SUMMARY

An embodiment of the invention provides an authentication method for an EVDO network so that for a UIM card in which an identifier supporting an MD5 authentication method is stored, NAI authentication can succeed with an IMSI stored in the UMI card in an NAI authentication process even if an NAI of a user stored in the UIM card is incorrect.

An embodiment of the invention further provides an authentication method for an EVDO network so that for a UIM card in which an identifier supporting an MD5 authentication method is stored, NAI authentication can succeed with an IMSI stored in the UMI card in an NAI authentication process even if no NAI of a user is stored in the UIM card.

To this end, an embodiment of the invention provides a first authentication method for an EVDO network including an NAI authentication method and a CHAP authentication method, wherein the NAI authentication method includes:

fetching an NAI of a user from a user identity model upon determining that an identifier supporting an MD5 authentication method is stored in the user identity model;

determining whether the NAI of the user is correct upon fetching the NAI from the user identity model;

transmitting the fetched NAI to an authentication server for authentication when the result of determination is yes; and fetching an International Mobile Subscriber Identity, IMSI, of the user from the user identity model when the result of determination is no, deriving an NAI of the user from the IMSI, and transmitting the derived NAI to the authentication server for authentication.

Furthermore the NAI authentication method in the authentication method for an EVDO network further includes:

fetching the IMSI from the user identity model when no NAI of the user is fetched from the user identity model, deriving the NAI of the user from the IMSI, and transmitting the derived NAI to the authentication server for authentication.

Furthermore the CHAP authentication method in the authentication method for an EVDO network includes:

receiving a CHAP authentication request, which carries a first key value, transmitted from the authentication server;

invoking the MD5 authentication method to calculate a first authentication key value from the first key value upon determining that the identifier supporting the Message Digest 5, MD5, authentication method is stored in the user identity model, and transmitting the first authentication key value to the authentication server for authentication; and invoking a Cellular Authentication and Voice Encryption, CAVE, authentication method to calculate a second authentication key value from a second key value upon reception of a CHAP re-authentication request, which carries the second key value, returned from the authentication server after failing in authentication with the first authentication key value, and transmitting the second authentication key value to the authentication server for authentication.

Still furthermore the CHAP authentication method in the authentication method for an EVDO network further includes:

invoking the CAVE method to calculate a third authentication key value from a third key value upon invoking in failure the MD5 authentication method and upon reception of a CHAP re-authentication request, which carries the third key value, returned from the authentication server due to failing to receive the first authentication key value, and transmitting the third authentication key value to the authentication server for authentication.

A mobile terminal for a Code Division Multiplex Access, CDMA, Evolution to packet Data Optimized, EVDO, network includes an Network Access Identifier, NAI, authentication device and a Challenge Handshake Authentication Protocol, CHAP, authentication device, wherein the NAI authentication device includes:

a unit configured to fetch an NAI of a user from a user identity model upon determining that an identifier supporting a Message Digest 5, MD5, authentication method is stored in the user identity model;

a unit configured to determine whether the NAI of the user is correct when the NAI is fetched from the user identity model;

a unit configured to transmit the fetched NAI to an authentication server for authentication when the result of determination is yes; and a unit configured to fetch an International Mobile Subscriber Identity, IMSI, of the user from the user identity model when the result of determination is no, to derive an NAI of the user from the IMSI and to transmit the derived NAI to the authentication server for authentication.

Furthermore the NAI authentication device in the mobile terminal for an EVDO network further includes:

a unit configured to fetch the International Mobile Subscriber Identity, IMSI, of the user from the user identity model when the NAI is not fetched from the user identity model; and a unit configured to derive the NAI of the user from the IMSI and to transmit the derived NAI to the authentication server for authentication.

An embodiment of the invention provides a second authentication method for a Code Division Multiplex Access, CDMA, Evolution to packet Data Optimized, EVDO, network, including an Network Access Identifier, NAI, authentication method and a Challenge Handshake Authentication Protocol, CHAP, authentication method, wherein the NAI authentication method includes:

fetching an International Mobile Subscriber Identity, IMSI, of a user from a user identity model upon determining that an identifier supporting a Message Digest 5, MD5, authentication method is stored in the user identity model but no NAI of the user is fetched from the user identity model;

deriving an NAI of the user from the IMSI; and transmitting the derived NAI to an authentication server for authentication.

Furthermore the CHAP authentication method in the authentication method for an EVDO network includes:

receiving a CHAP authentication request, which carries a first key value, transmitted from the authentication server;

invoking the MD5 authentication method to calculate a first authentication key value from the first key value upon determining that the identifier supporting the Message Digest 5, MD5, authentication method is stored in the user identity model, and transmitting the first authentication key value to the authentication server for authentication; and invoking a Cellular Authentication and Voice Encryption, CAVE, authentication method to calculate a second authentication key value from a second key value upon reception of a CHAP re-authentication request, which carries the second key value, returned from the authentication server after failing in authentication with the first authentication key value, and transmitting the second authentication key value to the authentication server for authentication.

Still furthermore the CHAP authentication method in the authentication method for an EVDO network further includes:

invoking the CAVE method to calculate a third authentication key value from a third key value upon invoking in failure the MD5 authentication method and upon reception of a CHAP re-authentication request, which carries the third key value, returned from the authentication server due to failing to receive the first authentication key value, and transmitting the third authentication key value to the authentication server for authentication.

A mobile terminal for a Code Division Multiplex Access, CDMA, Evolution to packet Data Optimized, EVDO, network includes an Network Access Identifier, NAI, authentication device and a Challenge Handshake Authentication Protocol, CHAP, authentication device, wherein the NAI authentication device includes:

a unit configured to fetch an International Mobile Subscriber Identity, IMSI, of a user from a user identity model upon determining that an identifier supporting a Message Digest 5, MD5, authentication method is stored in the user identity model but no NAI of the user is fetched from the user identity model;

a unit configured to derive an NAI of the user from the IMSI; and a unit configured to transmit the derived NAI to an authentication server for authentication.

Upon determining that an identifier supporting an MD5 authentication method is stored in a UMI card, a mobile terminal according to an embodiment of the invention fetches an NAI of a user from the UIM card and determines whether the NAI is correct, and if so, then the mobile terminal transmits the fetched NAI to an authentication server for authentication; otherwise, the mobile terminal fetches an IMSI of the user from the UIM card, derives an NAI and transmits the derived NAI to the authentication server for authentication, so that NAI authentication can succeed with the IMSI stored in the UIM card for the UIM card in which an identifier supporting the MD5 authentication method is stored even if the NAI stored in the UIM card is incorrect.

Upon fetching no NAI from a UIM card, a mobile terminal according to an embodiment of the invention fetches an IMSI of a user from the UIM card, derives an NAI and transmits the derived NAI to the authentication server for authentication, so that NAI authentication can succeed with the IMSI stored in the UIM card for the UIM card in which an identifier supporting the MD5 authentication method is stored even if the mobile terminal retrieves no NAI.

DETAILED DESCRIPTION

An authentication method for an EVDO network is performed generally in two operations that firstly a mobile terminal initiates NAI authentication and then an authentication server initiates CHAP authentication upon successful NAI authentication. After the two operations succeed, authentication is passed, and next the authentication server transmits to the mobile terminal a username and a password for the mobile terminal to log on the EVDO network, and the mobile terminal logs on the EVDO network, so that the entire authentication process ends.

Specifically, the authentication server requires provision of hardware identity (ID) authentication when the mobile terminal initiates a data call, and the so-called hardware ID refers to an Electronic Serial Number (ESN) or a Mobile Equipment Identifier (MEID) written when a cellular phone is shipped from a factory for the purpose to identify the identity of the mobile terminal. The mobile terminal initiates NAI authentication at the end of hardware ID authentication. The authentication server initiates CHAP authentication upon successful NAI authentication. After CHAP authentication is passed, then the authentication server transmits to the mobile terminal the username and the password for the mobile terminal to log on the EVDO network, and the mobile terminal logs on the EVDO network, so that the entire authentication process ends.

In an NAI authentication method for an EVDO network according to an embodiment of the invention, it is determined from whether an identifier supporting an MD5 authentication method is stored in a UIM card whether the UIM card supports the MD5 authentication method, and if so, then an NAI can be fetched directly from the UIM card for authentication, but in view of an error occurring with the NAI stored in the UIM card, after the NAI of a user is fetched from the UIM card in the embodiment of the invention, it is firstly determined whether the NAI is correct, and the fetched NAI is transmitted to the authentication server for authentication only if the fetched NAI is correct; otherwise, an IMSI of the user is further fetched from the UIM card, a correct NAI is derived from the IMSI, and then the derived NAI is transmitted to the authentication server for authentication. The IMSI stored in the UIM card is definitely correct, so that for the UIM card in which an identifier supporting the MD5 authentication is stored, NAI authentication can succeed with the IMSI stored in the UMI card even if the NAI stored in the UIM card is incorrect, and furthermore, NAI authentication can succeed with the IMSI stored in the UIM card even if no NAI is stored in the UIM card.

Figure 1:
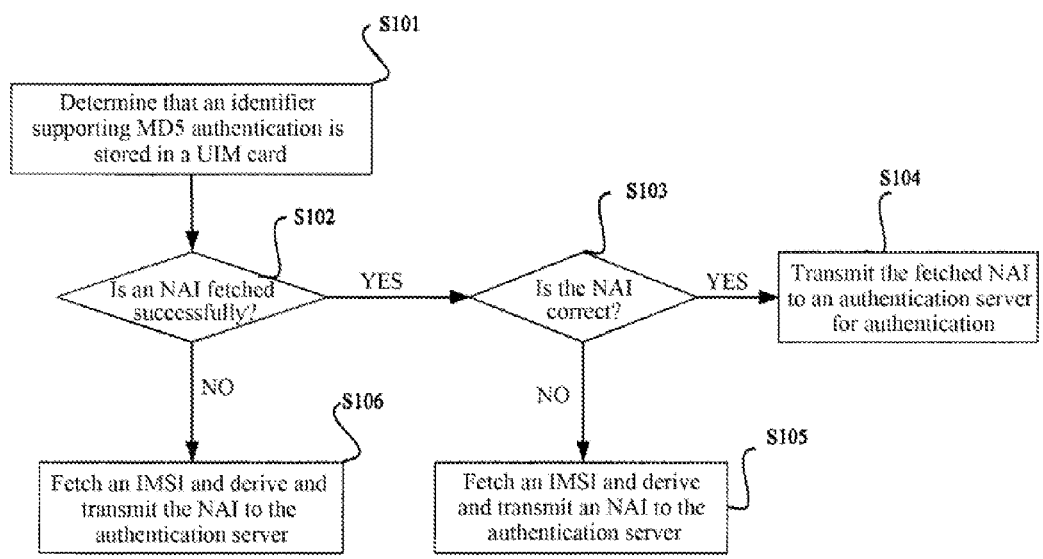
FIG. 1 is a flow chart of an NAI authentication method according to an embodiment of the invention.

Referring to FIG. 1, a flow of an NAI authentication method for an EVDO network according to an embodiment of the invention will be described below in details, which includes the following operations S101 to S106.

S101: A mobile terminal determines that an identifier supporting an MD5 authentication method is stored in a UIM card.

Particularly the mobile terminal determines that an identifier supporting the MD5 authentication method is stored in the UIM card in such a method that the mobile terminal firstly performs an operation of reading the UIM card after being powered on and determines that an identifier supporting the MD5 authentication method is stored in the UIM card upon detecting that the value at the N5 position of the card is 11.

S102: the mobile terminal determines whether an NAI of a user is fetched successfully from the UIM card, and if so, then the flow goes to the operation S103; otherwise, the flow goes to the operation S106.

S103: the mobile terminal determines whether the fetched NAI is correct.

A description will be given taking a Telecom required NAI as an example. A Telecom required NAI is IMSI@mycdma.cn, and correctness of the NAI can be determined as long as the fetched NAI complies with the Telecom required NAI, where IMSI stands for International Mobile Subscriber Identity, and mycdma.cn represents a fixed domain name field of the EVDO network. The NAI may be incorrect due to an incorrect format, an incorrect character, etc.

S104: the fetched NAI is transmitted to an authentication server for authentication when the result of determination is yes.

S105: an IMSI of the user is fetched from the UIM card when the result of determination is no, and an NAI of the user is derived from the IMSI, and the derived NAI is transmitted to the authentication server for authentication.

S106: the mobile terminal fetches the IMSI of the user from the UIM card, and derives the NAI of the user from the IMSI and transmits the derived NAI to the authentication server for authentication.

In the operations S105 and S106, in compliance with the format IMSI@mycdma.cn of the NAI, the mobile terminal adds @mycdma.cn subsequent to the fetched IMSI and derives the NAI in the format of IMSI@mycdma.cn.

Particularly the flow can end directly when the result of determination is no in the S102, and NAI authentication can still succeed with the IMSI even if an incorrect NAI is written into the UIM card.

Furthermore with the operation S106 performed when the result of determination is no in the operation S102, it is possible for the UIM card in which an identifier supporting the MD5 authentication method is stored to succeed in NAI authentication with the IMSI stored in the UIM card even if no NAI is written into the UIM card.

An embodiment of the invention further provides an NAI authentication method for an EVDO network in which only the operations S101, S102 and S106 performed when the result of determination is no in the S102 are included, so that NAI authentication can succeed with an IMSI for a UIM card in which an identifier supporting an MD5 authentication method is stored even if no NAI is written into the UIM card.

In order to succeed in NAI authentication for a UIM card in which an identifier supporting an MD5 authentication method is stored even if an NAI in the UIM card is incorrect, an embodiment of the invention further provides an NAI authentication device in which the foregoing NAI authentication method is performed and which includes:

a unit configured to fetch an NAI of a user from a UIM card upon determining that an identifier supporting an MD5 authentication method is stored in the UIM card;

a unit configured to determine whether the NAI is correct;

a unit configured to transmit the fetched NAI to an authentication server for authentication when the result of determination is yes; and a unit configured to fetch an IMSI of the user from the UIM card when the result of determination is no, to derive an NAI of the user from the IMSI and to transmit the derived NAI to the authentication server for authentication.

Furthermore in order to derive an NAI and succeed in NAI authentication for the UIM card in which an identifier supporting the MD5 authentication method is stored even if no NAI is written into the card, the NAI authentication device according to an embodiment of the invention further includes:

a unit configured to fetch the IMSI of the user from the UIM card when no network access identifier is fetched from the UIM card; and a unit configured to derive the NAI of the user from the IMSI and to transmit the derived NAI to the authentication server for authentication.

And an embodiment of the invention provides a second NAI authentication device including:

a unit configured to fetch an International Mobile Subscriber Identity, IMSI, of a user from a user identity model upon determining that an identifier supporting an MD5 authentication method is stored in the user identity model but no network access identifier of the user is fetched from the user identity model;

a unit configured to derive a network access identifier of the user from the IMSI; and a unit configured to transmit the derived network access identifier to an authentication server for authentication.

The foregoing technical solution relates to an NAI authentication method for an EVDO network, and integral authentication further involves CHAP authentication initiated from the authentication server to the mobile terminal so that the authentication server initiates CHAP authentication to the mobile terminal after successful NAI authentication.

An embodiment of the invention further provides a CHAP authentication method. Upon reception of a CHAP authentication request carrying a first key value transmitted from an authentication server, a mobile terminal determines that an identifier supporting an MD5 authentication method is stored in a UIM card, invokes the MD5 authentication method in the UIM card to calculate a first authentication key value from the first key value and transmits it to the authentication server for authentication, but in view of that the authentication server may not support the MD5 authentication method, in an embodiment of the invention, upon reception of a CHAP re-authentication request returned from the authentication server after failing in authentication with the first authentication key, the mobile terminal invokes a CAVE authentication method to calculate a second authentication key value from a second key value in the CHAP re-authentication request and transmits the second authentication key value to the authentication server for authentication. The authentication server of the existing EVDO network definitely supports the CAVE authentication method, so that for the UIM card in which an identifier supporting the MD5 authentication method is stored, CHAP authentication can succeed even if the authentication server has a drawback of failing to support the MD5 authentication method, and furthermore, CHAP authentication can succeed by invoking the CAVE authentication method to calculate a third key value and transmitting it to the authentication server even if the MD5 authentication method is not written into the UIM card although an identifier supporting the MD5 authentication method is stored therein, and still furthermore, CHAP authentication can succeed by invoking directly the CAVE authentication method to calculate a fourth authentication key value and transmitting it to the authentication server even if the UIM card supports the CAVE authentication method.

Figure 2:
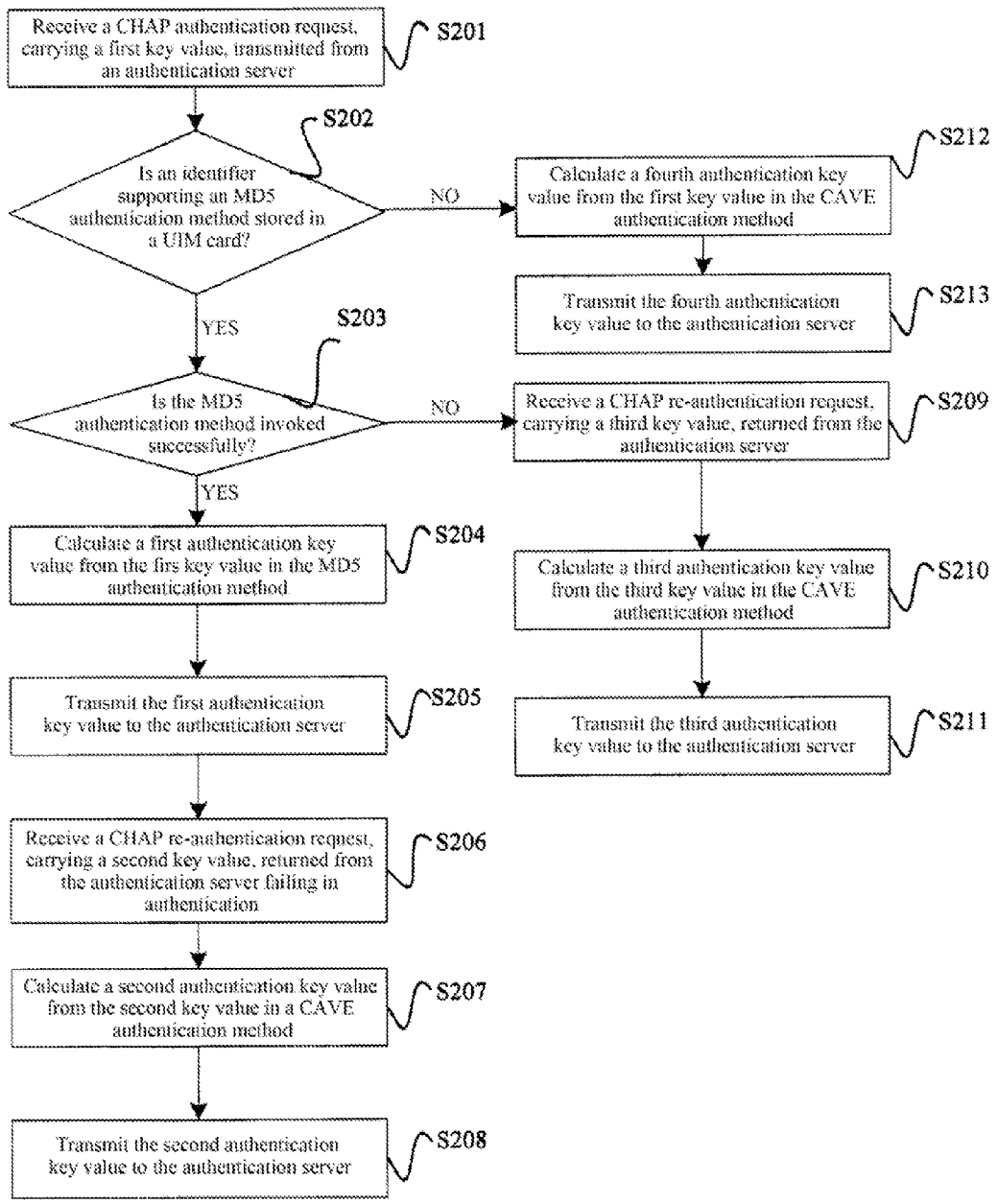
FIG. 2 is a flow chart of a CHAP authentication method according to an embodiment of the invention.

As illustrated in FIG. 2, a flow of a CHAP authentication method according to an embodiment of the invention is as follows:

S201: a mobile terminal receives a CHAP authentication request transmitted from an authentication server, which carrying a name of the authentication request, a description of the authentication request and a first key value, and the mobile terminal fetches the first key value upon reception of the CHAP authentication request.

S202: the mobile terminal determines whether an identifier supporting an MD5 authentication method is stored in a UIM card, and if so, then the mobile terminal performs the operation S203; otherwise, the mobile terminal performs the operations S212 to S213.

Specifically, the mobile terminal performs an operation of reading the UIM card after being powered on and determines that an identifier supporting the MD5 authentication method is stored in the UIM card upon detecting that the value at the N5 position of the card is 11.

S203: the mobile terminal determines whether the MD5 authentication method is invoked successfully, and if so, then the mobile terminal performs the operations S204 to S208; otherwise, the mobile terminal performs the operations S209 to S211.

S204: the mobile terminal calculates a first authentication key value from the first key value in the MD5 authentication method.

S205: the mobile terminal transmits the first authentication key value to the authentication server for authentication.

Particularly, if the authentication server supports the MD5 authentication method (that is, authentication succeeds), then CHAP authentication ends directly. If the authentication server does not support the MD5 authentication (that is, authentication fails), then the mobile terminal continues with performing the operation S206.

S206: the mobile terminal receives a CHAP re-authentication request, which carries a name of the re-authentication request, a description of the re-authentication request and a second key value, returned from the authentication server after failing in authentication with the first authentication key value.

S207: the mobile terminal invokes a CAVE authentication method to calculate a second authentication key value from the second key value in the CHAP re-authentication request.

S208: the mobile terminal transmits the second authentication key value to the authentication server for authentication.

S209: the mobile terminal receives a CHAP re-authentication request, which carries a third key value, returned from the authentication server due to failing to receive the first authentication key value.

S210: the mobile terminal invokes the CAVE authentication method to calculate a third authentication key value from the third key value.

S211: the mobile terminal transmits the third authentication key value to the authentication server for authentication.

S212: the mobile terminal invokes the CAVE authentication method to derive a fourth authentication key value from the first key value in the CHAP authentication request.

S213: the mobile terminal transmits the fourth authentication key value to the authentication server for authentication.

Particularly the flow can end directly when the result of determination is no in the S203, and CHAP authentication can still succeed even if the authentication server does not support the MD5 authentication method.

Furthermore with the operations S209 to S211 performed when the result of determination is no in the operation S203, it is possible to succeed in CHAP authentication even if the MD5 authentication method is not written into the UIM card although an identifier supporting the MD5 authentication method is stored in the UIM card.

Particularly the flow can end directly when the result of determination is no in the operation 202, and CHAP authentication can still succeed for the UIM card in which an identifier supporting the MD5 authentication method is stored.

Furthermore with the operations S212 to S213 performed when the result of determination is no in the operation S202, it is possible to succeed in CHAP authentication even if the mobile terminal determines that the UIM card supports the CAVE authentication method.

In order to succeed in CHAP authentication for a UIM card in which an identifier supporting an MD5 authentication method is stored even if an authentication server does not support the MD5 authentication method, an embodiment of the invention further provides a CHAP authentication device in which the foregoing CHAP authentication method is performed and which includes:

a unit configured to receive an CHAP authentication request, which includes a first key value, transmitted from an authentication server;

a unit configured to invoke an MD5 authentication method to calculate a first authentication key value from the first key value upon determining that an identifier supporting the MD5 authentication method is stored in a UIM card and to transmit the first authentication key value to the authentication server for authentication; and a unit configured to invoke a CAVE authentication method to calculate a second authentication key value from a second key value in a CHAP re-authentication request returned from the authentication server after failing in authentication with the first authentication key value upon reception of the CHAP re-authentication request and to transmit the second authentication key value to the authentication server for authentication.

Furthermore in order to succeed in CHAP authentication for the UIM card in which an identifier supporting the MD5 authentication method is stored even if the MD5 authentication method is not written into the UIM card, the CHAP authentication device according to an embodiment of the invention further includes:

a unit configured to invoke the CAVE authentication method to calculate a third authentication key value from a third key value upon reception of a CHAP re-authentication request, which carries the third key value, returned from the authentication server due to failing to receive the first authentication key value when the MD5 authentication method is invoked in failure and to transmit the third authentication key value to the authentication server for authentication.

The foregoing NAI authentication method and CHAP authentication method according to the embodiments of the invention can be used in combination, and therefore an embodiment of the invention further provides a mobile terminal including the respective function units described as above.

Apparently those skilled in the art can make various modifications and variations to the invention without departing from the scope of the invention. Thus the invention is also intended to encompass these modifications and variations to the invention provided that these modifications and variations come into the scope of the claims appended to the invention and their equivalents.

The invention claimed is:

1. An authentication method for a Code Division Multiplex Access, CDMA, Evolution to packet Data Optimized, EVDO, network, comprising a Network Access Identifier, NAI, authentication method and a Challenge Handshake Authentication Protocol, CHAP, authentication method, wherein the NAI authentication method comprises:

fetching an NAI of a user from a user identity model upon determining that an identifier supporting a Message Digest 5, MD5, authentication method is stored in the user identity model;

determining whether the NAI of the user is correct upon fetching the NAI from the user identity model;

transmitting the fetched NAI to an authentication server for authentication when the result of determination is yes; and fetching an International Mobile Subscriber Identity, IMSI, of the user from the user identity model when the result of determination is no, deriving an NAI of the user from the IMSI, and transmitting the derived NAI to the authentication server for authentication.

2. The authentication method for the EVDO network according to claim 1, wherein the NAI authentication method further comprises:

fetching the IMSI from the user identity model when no NAI of the user is fetched from the user identity model, deriving the NAI of the user from the IMSI, and transmitting the derived NAI to the authentication server for authentication.

3. The authentication method for the EVDO network according to claim 2, wherein the NAI of the user derived from the IMSI comprises the International Mobile Subscriber Identity, IMSI, and a fixed domain name field of the EVDO network, which are connected.

4. The authentication method for the EVDO network according to claim 2, wherein the CHAP authentication method comprises:

receiving a CHAP authentication request, which carries a first key value, transmitted from the authentication server;

invoking the MD5 authentication method to calculate a first authentication key value from the first key value upon determining that the identifier supporting the Message Digest 5, MD5, authentication method is stored in the user identity model, and transmitting the first authentication key value to the authentication server for authentication; and invoking a Cellular Authentication and Voice Encryption, CAVE, authentication method to calculate a second authentication key value from a second key value upon reception of a CHAP re-authentication request, which carries the second key value, returned from the authentication server after failing in authentication with the first authentication key value, and transmitting the second authentication key value to the authentication server for authentication.

5. The authentication method for the EVDO network according to claim 4, wherein the CHAP authentication method further comprises:

invoking the CAVE method to calculate a third authentication key value from a third key value upon invoking in failure the MD5 authentication method and upon reception of a CHAP re-authentication request, which carries the third key value, returned from the authentication server due to failing to receive the first authentication key value, and transmitting the third authentication key value to the authentication server for authentication.

6. The authentication method for the EVDO network according to claim 1, wherein the NAI of the user derived from the IMSI comprises the International Mobile Subscriber Identity, IMSI, and a fixed domain name field of the EVDO network, which are connected through "@".

7. The authentication method for the EVDO network according to claim 1, wherein the CHAP authentication method comprises:

receiving a CHAP authentication request, which carries a first key value, transmitted from the authentication server;

invoking the MD5 authentication method to calculate a first authentication key value from the first key value upon determining that the identifier supporting the Message Digest 5, MD5, authentication method is stored in the user identity model, and transmitting the first authentication key value to the authentication server for authentication; and invoking a Cellular Authentication and Voice Encryption, CAVE, authentication method to calculate a second authentication key value from a second key value upon reception of a CHAP re-authentication request, which carries the second key value, returned from the authentication server after failing in authentication with the first authentication key value, and transmitting the second authentication key value to the authentication server for authentication.

8. The authentication method for the EVDO network according to claim 7, wherein the CHAP authentication method further comprises:

invoking the CAVE method to calculate a third authentication key value from a third key value upon invoking in failure the MD5 authentication method and upon reception of a CHAP re-authentication request, which carries the third key value, returned from the authentication server due to failing to receive the first authentication key value, and transmitting the third authentication key value to the authentication server for authentication.

9. An authentication method for a Code Division Multiplex Access, CDMA, Evolution to packet Data Optimized, EVDO, network, comprising a Network Access Identifier, NAI, authentication method and a Challenge Handshake Authentication Protocol, CHAP, authentication method, wherein the NAI authentication method comprises:

fetching an International Mobile Subscriber Identity, IMSI, of a user from a user identity model upon determining that an identifier supporting a Message Digest 5, MD5, authentication method is stored in the user identity model but no NAI of the user is fetched from the user identity model;

deriving an NAI of the user from the IMSI; and transmitting the derived NAI to an authentication server for authentication.

10. The authentication method for the EVDO network according to claim 9, wherein the NAI of the user derived from the IMSI comprises the International Mobile Subscriber Identity, IMSI, and a fixed domain name field of the EVDO network, which are connected through "@".

11. The authentication method for the EVDO network according to claim 9, wherein the CHAP authentication method comprises:

receiving a CHAP authentication request, which carries a first key value, transmitted from the authentication server;

invoking the MD5 authentication method to calculate a first authentication key value from the first key value upon determining that the identifier supporting the Message Digest 5, MD5, authentication method is stored in the user identity model, and transmitting the first authentication key value to the authentication server for authentication; and invoking a Cellular Authentication and Voice Encryption, CAVE, authentication method to calculate a second authentication key value from a second key value upon reception of a CHAP re-authentication request, which carries the second key value, returned from the authentication server after failing in authentication with the first authentication key value, and transmitting the second authentication key value to the authentication server for authentication.

12. The authentication method for the EVDO network according to claim 11, wherein the CHAP authentication method further comprises:

invoking the CAVE method to calculate a third authentication key value from a third key value upon invoking in failure the MD5 authentication method and upon reception of a CHAP re-authentication request, which carries the third key value, returned from the authentication server due to failing to receive the first authentication key value, and transmitting the third authentication key value to the authentication server for authentication.

13. A mobile terminal for a Code Division Multiplex Access, CDMA, Evolution to packet Data Optimized, EVDO, network, comprising a Network Access Identifier, NAI, authentication device and a Challenge Handshake Authentication Protocol, CHAP, authentication device, wherein the NAI authentication device comprises a processor that stores program code, wherein the program code is executable to implement:

a unit configured to fetch an NAI of a user from a user identity model upon determining that an identifier supporting a Message Digest 5, MD5, authentication method is stored in the user identity model;

a unit configured to determine whether the NAI of the user is correct when the NAI is fetched from the user identity model;

a unit configured to transmit the fetched NAI to an authentication server for authentication when the result of determination is yes; and a unit configured to fetch an International Mobile Subscriber Identity, IMSI, of the user from the user identity model when the result of determination is no, to derive an NAI of the user from the IMSI and to transmit the derived NAI to the authentication server for authentication.

14. The mobile terminal for an EVDO network according to claim 13, wherein the program code stored in the processor of the NAI authentication device is executable to further implement:
- a unit configured to fetch the International Mobile Subscriber Identity, IMSI, of the user from the user identity model when no NAI of the user is fetched from the user identity model; and
- a unit configured to derive the NAI of the user from the IMSI and to transmit the derived NAI to the authentication server for authentication.

15. The mobile terminal for the EVDO network according to claim 14, wherein the NAI of the user derived from the IMSI comprises the International Mobile Subscriber Identity, IMSI, and a fixed domain name field of the EVDO network, which are connected through "@".

16. The mobile terminal for the EVDO network according to claim 14, wherein the CHAP authentication device comprises a processor that stores program code, wherein the program code is executable to implement:
- a unit configured to receive a CHAP authentication request, which carries a first key value, transmitted from the authentication server;
- a unit configured to invoke the MD5 authentication method to calculate a first authentication key value from the first key value upon determining that the identifier supporting the Message Digest 5, MD5, authentication method is stored in the user identity model, and to transmit the first authentication key value to the authentication server for authentication; and
- a unit configured to invoke a Cellular Authentication and Voice Encryption, CAVE, authentication method to calculate a second authentication key value from a second key value upon reception of a CHAP re-authentication request, which carries the second key value, returned from the authentication server after failing in authentication with the first authentication key value, and to transmit the second authentication key value to the authentication server for authentication.

17. The mobile terminal for the EVDO network according to claim 16, wherein the program code stored in the processor of the CHAP authentication device is executable to further implement:
- a unit configured to invoke the CAVE method to calculate a third authentication key value from a third key value upon invoking in failure the MD5 authentication method and upon reception of a CHAP re-authentication request, which carries the third key value, returned from the authentication server due to failing to receive the first authentication key value, and to transmit the third authentication key value to the authentication server for authentication.

18. The mobile terminal for the EVDO network according to claim 13, wherein the NAI of the user derived from the IMSI comprises the International Mobile Subscriber Identity, IMSI, and a fixed domain name field of the EVDO network, which are connected through "@".

19. The mobile terminal for the EVDO network according to claim 13, wherein the CHAP authentication device comprises a processor that stores program code, wherein the program code is executable to implement:
- a unit configured to receive a CHAP authentication request, which carries a first key value, transmitted from the authentication server;
- a unit configured to invoke the MD5 authentication method to calculate a first authentication key value from the first key value upon determining that the identifier supporting the Message Digest 5, MD5, authentication method is stored in the user identity model, and to transmit the first authentication key value to the authentication server for authentication; and
- a unit configured to invoke a Cellular Authentication and Voice Encryption, CAVE, authentication method to calculate a second authentication key value from a second key value upon reception of a CHAP re-authentication request, which carries the second key value, returned from the authentication server after failing in authentication with the first authentication key value, and to transmit the second authentication key value to the authentication server for authentication.

20. The mobile terminal for the EVDO network according to claim 19, wherein the program code stored in the processor of the CHAP authentication device is executable to further implement:
- a unit configured to invoke the CAVE method to calculate a third authentication key value from a third key value upon invoking in failure the MD5 authentication method and upon reception of a CHAP re-authentication request, which carries the third key value, returned from the authentication server due to failing to receive the first authentication key value, and to transmit the third authentication key value to the authentication server for authentication.

* * * * *